United States Patent
Yin et al.

(10) Patent No.: US 8,284,837 B2
(45) Date of Patent: Oct. 9, 2012

(54) VIDEO CODEC WITH WEIGHTED PREDICTION UTILIZING LOCAL BRIGHTNESS VARIATION

(75) Inventors: Peng Yin, West Windsor, NJ (US); Jill MacDonald Boyce, Manalapan, NJ (US); Alexandros Tourapis, Burbank, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 1233 days.

(21) Appl. No.: 11/662,903

(22) PCT Filed: Sep. 14, 2005

(86) PCT No.: PCT/US2005/032885
§ 371 (c)(1),
(2), (4) Date: Mar. 25, 2008

(87) PCT Pub. No.: WO2006/033953
PCT Pub. Date: Mar. 30, 2006

(65) Prior Publication Data
US 2008/0253456 A1 Oct. 16, 2008

Related U.S. Application Data

(60) Provisional application No. 60/610,275, filed on Sep. 16, 2004.

(51) Int. Cl.
*H04B 1/66* (2006.01)
*H04N 7/12* (2006.01)
*H04N 11/02* (2006.01)
*H04N 11/04* (2006.01)

(52) U.S. Cl. .............................. 375/240.16; 375/240.12

(58) Field of Classification Search ..................... None
See application file for complete search history.

(56) References Cited

U.S. PATENT DOCUMENTS

| | | | |
|---|---|---|---|
| 5,544,239 A | 8/1996 | Golin et al. | |
| 6,266,370 B1 | 7/2001 | Kamikura et al. | |
| 6,278,792 B1 * | 8/2001 | Cox et al. | 382/100 |
| 6,456,658 B2 | 9/2002 | Kamikura et al. | |
| 7,463,684 B2 | 12/2008 | Srinivasan et al. | |
| 2002/0196849 A1 | 12/2002 | Kamikura et al. | |
| 2003/0123553 A1* | 7/2003 | Kerofsky | 375/240.25 |
| 2003/0161404 A1* | 8/2003 | Wu | 375/240.16 |
| 2003/0189655 A1* | 10/2003 | Lim et al. | 348/241 |
| 2004/0057523 A1 | 3/2004 | Koto et al. | |

(Continued)

FOREIGN PATENT DOCUMENTS

JP 10136385 A 5/1998

(Continued)

OTHER PUBLICATIONS

Search Report dated Nov. 25, 2005.

(Continued)

*Primary Examiner* — Phirin Sam
(74) *Attorney, Agent, or Firm* — Robert D. Shedd; Paul P. Kiel; Guy H. Eriksen

(57) ABSTRACT

There are provided video encoders, video decoders, and corresponding encoding and decoding methods for video data for a picture, wherein the video data has local brightness variation. The video encoder includes an encoder for inter-coding the video data using a localized weighted function to determine weights for the local brightness variation. The weights for the localized weighted function are derived without explicit coding.

44 Claims, 7 Drawing Sheets

U.S. PATENT DOCUMENTS

2004/0071210 A1     4/2004    Amara et al.
2004/0267851 A1*   12/2004   Singhal ........................ 708/490
2009/0262833 A1    10/2009   Chujoh et al.

FOREIGN PATENT DOCUMENTS

| WO | 2004008642 A2 | 1/2004 |
| WO | 2004008761 A1 | 1/2004 |
| WO | 2004008762 A1 | 1/2004 |
| WO | 2004032357 A1 | 4/2004 |
| WO | 2004032506 A1 | 4/2004 |
| WO | 2004054225 A2 | 6/2004 |
| WO | WO 2004/064255 A2 | 7/2004 |

OTHER PUBLICATIONS

Wiegand, T.: "Text of Final Committee Draft of Joint Video Specification (ITU-T REC. H.264/ISO/IEC 14496-10 AVC) MPEG02/N4920" International Organization for Standardization—Organisation Internationale De Normalisation ISO/IEC JTC1/SC29/WG11, Jul. 2002, pp. I-XV, 1, XP001100641 Klagenfurt, AT.

\* cited by examiner

VIDEO CODEC WITH WEIGHTED PREDICTION UTILIZING LOCAL BRIGHTNESS VARIATION

CROSS-REFERENCE TO RELATED APPLICATIONS

This application claims the benefit, under 35 U.S.C. §365 of International Application PCT/US2005/032885, filed Sep. 14, 2005, which was published in accordance with PCT Article 21(2) on Mar. 30, 2006 in English and claims priority of 60/610,275 filed Sep. 16, 2004.

FIELD OF THE INVENTION

The present invention relates generally to video coders and decoders and, more particularly, to a method and apparatus for weighted prediction video coding and decoding utilizing local brightness variation.

BACKGROUND OF THE INVENTION

Video compression coders and/or decoders (CODECs) gain much of their compression from interframe prediction. However, the simple interframe technique cannot sufficiently improve coding efficiency when temporal brightness variation is involved.

The H.264/JVT/MPEG AVC ("H.264") video compression standard provides a weighted prediction tool. This works well for global brightness variation, but due to the limitation of the number of different weighting parameters that can be used, little gain can be achieved in the presence of significant local brightness variation.

The interframe prediction process forms a reference picture prediction of a picture to be encoded, and encodes the difference between the current picture and the prediction. The more closely correlated the prediction is to the current picture, the fewer the bits that are needed to compress the picture.

In prior video CODECs, the reference picture is formed using a previously decoded picture. Unfortunately, when serious temporal brightness variation is involved, e.g. due to illumination changes, fade-in/out effects, camera flashes, etc., conventional motion compensation can fail (or become extremely inefficient).

In H.264, a weighted prediction (WP) tool is used to improve coding efficiency. WP estimates the brightness variation by a multiplicative weighting factor a and an additive weighting offset b as in equation (eq: 1).

$$I(x,y,t) = a \cdot I(x+mvx, y+mvy, t-1) + b \quad (1)$$

where $I(x,y,t)$ is the brightness intensity of pixel $(x,y)$ at time $t$, $a$ and $b$ are constant values in the measurement region, and $(mvx, mvy)$ is the motion vector.

Weighted prediction is supported in the Main and Extended profiles of the H.264 standard. The use of weighted prediction is indicated in the picture parameter sets for P and SP slices using the weighted_pred_flag field, and for B slices using the weighted_bipred_idc field. There are two WP modes, an explicit mode and an implicit mode. The explicit mode is supported in P, SP, and B slices. The implicit mode is supported in B slices only.

In WP, the weighting factor used is based on the reference picture index (or indices in the case of bi-prediction) of the current macroblock or macroblock partition. The reference picture indices are either coded in the bitstream or may be derived, e.g., for skipped or direct mode macroblocks. A single weighting factor and a single offset are associated with each reference picture index for all slices of the current picture. For the explicit mode, these parameters are coded in the slice header. For the implicit mode, these parameters are derived. The weighting factors and offset parameter values are also constrained to allow 16 bit arithmetic operations in the inter prediction process.

The explicit mode is indicated by weighted_pred_flag equal to 1 in P or SP slices, or by weighted_bipred_idc equal to 1 in B slices. As previously stated, in this mode, the WP parameters are coded in the slice header. A multiplicative weighting factor and an additive offset for each color component may be coded for each of the allowable reference pictures in list 0 for P slices and B slices. The number of allowable reference pictures in list 0 is indicated by num_ref_idx_l0_active_minus1, while for list 1 (for B slices) this is indicated by num_ref_idx_l1_active_minus1.

For global brightness variation that is uniformly applied across an entire picture, a single weighting factor and offset are sufficient to efficiently code all macroblocks in a picture that are predicted from the same reference picture. However, for brightness variation that is non-uniformly applied, e.g. for lighting changes or camera flashes, more than one reference picture index can be associated with a particular reference picture store by using reference picture reordering. This allows different macroblocks in the same picture to use different weighting factors even when predicted from the same reference picture. Nevertheless, the number of reference pictures that can be used in H.264 is restricted by the current level and profile, or is constrained by the complexity of motion estimation. This can considerably limit the efficiency of WP during local brightness variations.

Accordingly, it would be desirable and highly advantageous to have a method and apparatus for weighted prediction video coding that overcomes at least the above-identified deficiencies of the prior art.

SUMMARY OF THE INVENTION

These and other drawbacks and disadvantages of the prior art are addressed by the present invention, which is directed to a method and apparatus for weighted prediction video coding and decoding utilizing local brightness variation.

According to an aspect of the present invention, there is provided a video encoder for encoding video data for a picture. The video data has local brightness variation. The video encoder includes an encoder for inter-coding the video data using a localized weighted function to determine weights for the local brightness variation. The weights for the localized weighted function are derived without explicit coding.

According to another aspect of the present invention, there is provided a method for encoding video data for a picture. The video data has local brightness variation. The method includes the step of inter-coding the video data using a localized weighted function to determine weights for the local brightness variation. The weights for the localized weighted function are derived without explicit coding.

According to yet another aspect of the present invention, there is provided a video decoder for decoding video data for a picture. The video data has local brightness variation. The video decoder includes a decoder for decoding the video data using a localized weighted function to determine weights for the local brightness variation. The weights for the localized weighted function are derived without explicit coding.

According to still another aspect of the present invention, there is provided a method for decoding video data for a picture. The video data has local brightness variation. The method includes the step of decoding the video data using a localized weighted function to determine weights for the local brightness variation. The weights for the localized weighted function are derived without explicit coding.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which.

DETAILED DESCRIPTION

Figure 1:
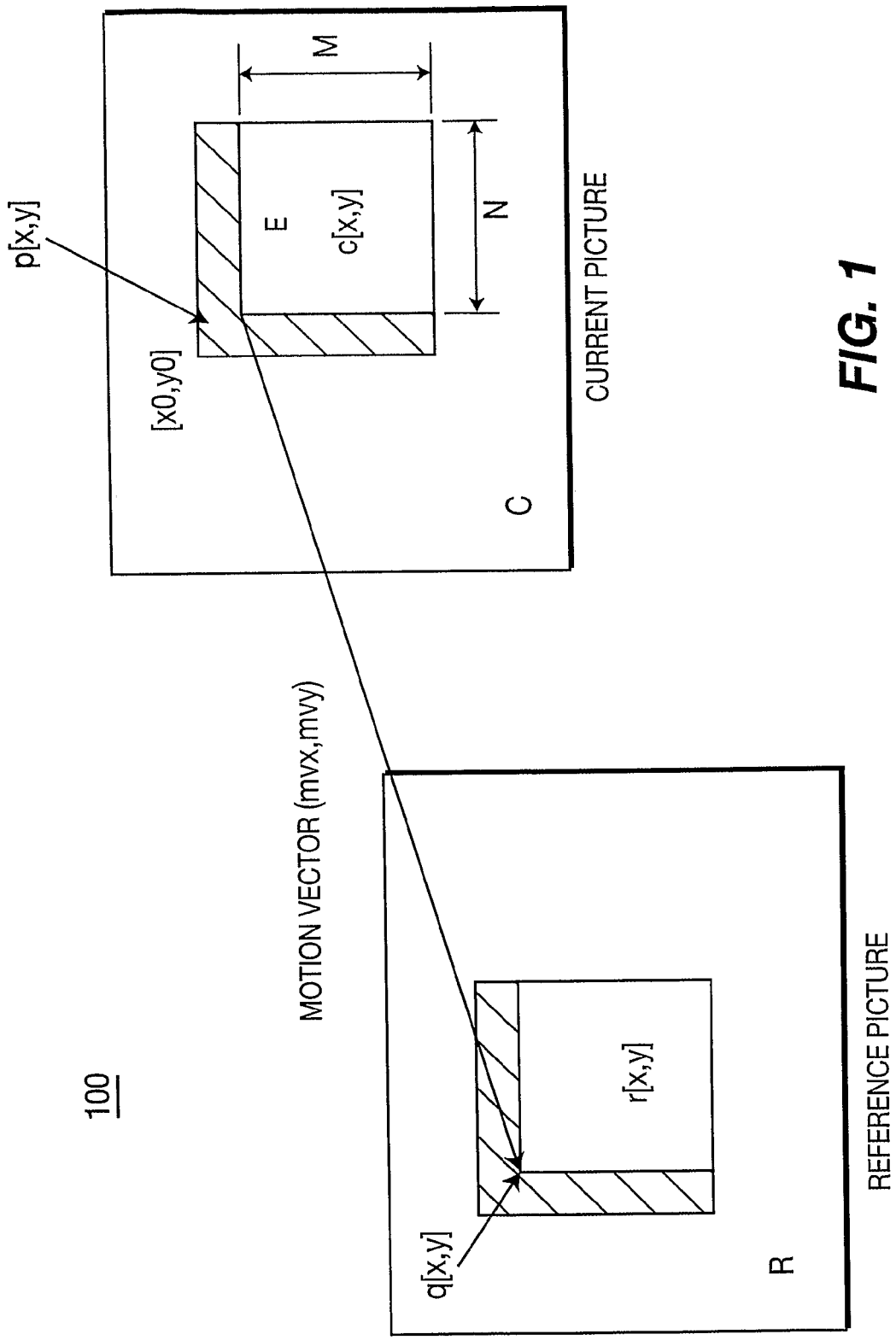
FIG. 1 shows a block diagram for a motion estimation and compensation process in accordance with the principles of the present invention.

The present invention is directed to a method and apparatus for weighted prediction video coding and decoding utilizing local brightness variation.

In an illustrative embodiment in which the present invention is used in an H.264 compliant context, the weights are estimated from previously encoded and reconstructed neighboring pixels of the current block in the source picture and their corresponding motion predicted (or co-located) pixels in the reference pictures. Advantageously, the present invention does not require any additional bits to be transmitted, since the information is available in both encoder and decoder for deriving these weights.

As used herein, the term "co-located" refers to a pixel in a different frame, field or picture, at the same location. Moreover, the term "neighboring" refers to a pixel in the current frame, field or picture, in a nearby (but different) location, which may be adjacent, but not required to be so.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

With respect to encoding in the presence of significant local brightness variations, from Equation 1, it can be seen that in order to be able to efficiently handle the local variations, it may be necessary to use a rather large set of weighting parameters a and b. Unfortunately, many bits would be required to code these parameters.

Advantageously, a method and apparatus are provided to handle local brightness variations. Instead of explicitly coding and transmitting the weights, these may be estimated from the previously encoded and reconstructed neighboring pixels of the current block in the source picture and its corresponding motion predicted (or co-located) pixels in the reference pictures. Since this information is available in both the encoder and decoder, weights can be easily derived and no additional bits are required to signal the weights.

Turning to FIG. 1, a motion estimation and compensation process is generally indicated by the reference numeral 100. The motion estimation and compensation process 100 relates to a current picture C and a reference picture R.

Given a block E, denote its pixel $c[x,y]=C[x_0+x,y_0+y]$, where $[x_0,y_0]$ is the upper-left pixel position of block E in current picture C, $x=0\ldots N-1$, $y=0\ldots M-1$, N is the width of E, and M is the height of E. Moreover, denote E's previously encoded and reconstructed neighboring samples as $p[x,y]$, with its left neighboring samples (if available) as $p[-1,y]=C[x_0-1, y_0+y]$, $y=0\ldots M-1$, upper neighboring samples (if available) as $p[x,-1]=C[x_0+x,y_0-1]$, $x=0\ldots N-1$, and upper-left neighboring sample (if available) as $p[-1,-1]=C[x_0-1,y_0-1]$. Further, denote $p[x,y]$'s corresponding motion predicted in the reference picture R as $q[x,y]=R[x_0+x+mvx,y_0+y+mvy]$, where [mvx,mvy] is the motion vector of block. Then, the weighted function W can be estimated/fitted from the corresponding neighboring pixels, $p[x,y]$ and $q[x,y]$, which satisfies $p=W(F(q))$, where F is a filter. Therefore, $r[x,y]=W(G(R[x_0+x+mvx, y_0+y+mvy]))$, where $r[x,y]$ is the pixel of the motion predicted block of E in the reference picture R, and G is a filter.

In a simpler embodiment, $q[x,y]$ are the co-located pixels in the reference picture R, without application of a motion vector, $q[x,y]=R[x_0+x, y_0+y]$. In this case, the weighted function W can be estimated/fitted from the corresponding neighboring pixels $p[x,y]=W(F(R[x_0+x, y_0+y]))$.

Therefore, in order to decode the picture using the present invention, the decoder only needs to have knowledge of the weighting function W and the derivation (fitting method) of the coefficients of W using the available information, and the filters F and G.

Figure 2A:
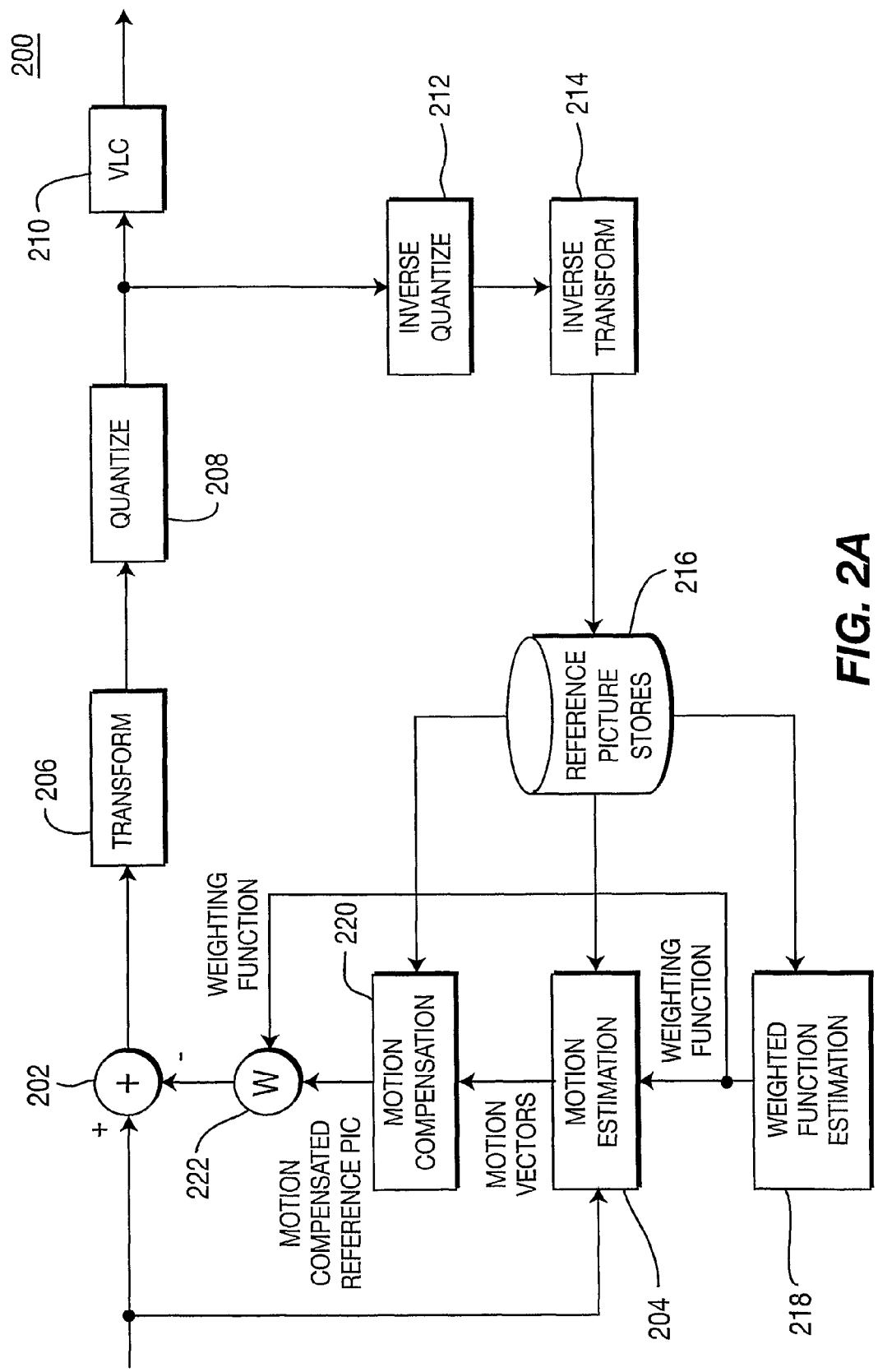
FIG. 2A shows a block diagram for an encoder for encoding video data using weighted prediction in accordance with the principles of the present invention.

Turning to FIG. 2A, an encoder for encoding video data using weighted prediction is indicated generally by the reference numeral 200. An input to the encoder 200 is connected in signal communication with a non-inverting input of a summing junction 202 (the purpose of the summing junction is to define the difference between the input at the encoder and the prediction, which is then subsequently coded in the encoder) and with a first input of a motion estimator 204. An output of the summing junction 202 is connected in signal communication with an input of a transformer 206. An output of the transformer 206 is connected in signal communication with an input of a quantizer 208. An output of the quantizer 208 is connected in signal communication with an input of a variable length coder ("VLC") 210, and with an input of an inverse quantizer 212. An output of the VLC 210 is available as external output of the encoder 200.

An output of the inverse quantizer 212 is connected in signal communication with an input of an inverse transformer 214. An output of the inverse transformer 214 is connected in signal communication with an input of a reference picture store 216. A first output of the reference picture store 216 is connected in signal communication with an input of a weighted function estimator 218. A second output of the reference picture store 216 is connected in signal communication with a second input of the motion estimator 204. A third output of the reference picture store 216 is connected in signal communication with a first input of a motion compensator 220. An output of the weighed function estimator 218 is connected in signal communication with a third input of the motion estimator 204 and with a first input of a weighted function module 222. An output of the motion estimator 204 is connected in signal communication with a second input of the motion compensator 220. An output of the motion compensator 220 is connected in signal communication with a second input of the weighted function module 222. An output of the weighted function module 222 is connected in signal communication with an inverting input of the summing junction 202.

Figure 2B:
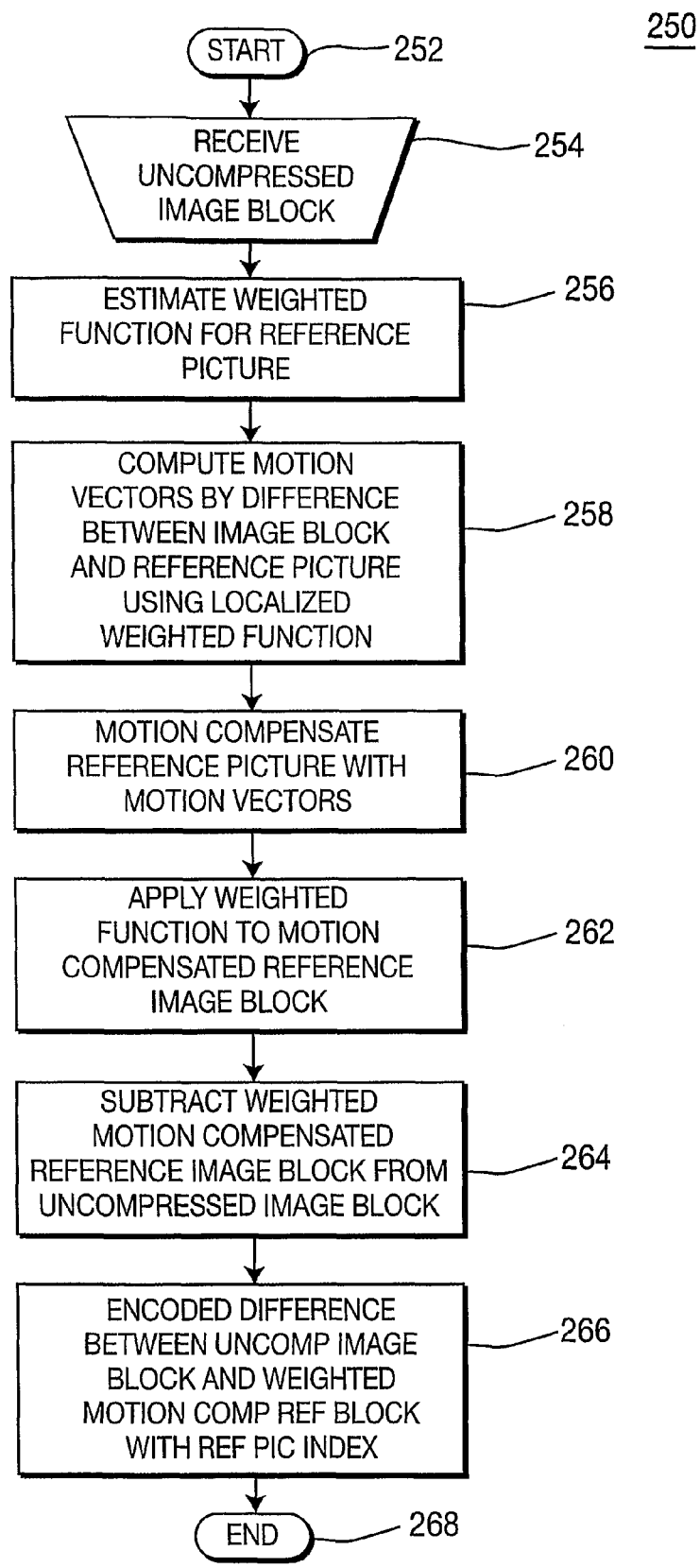
FIG. 2B shows a flow diagram for a method for encoding video data using weighted prediction in accordance with the principles of the present invention.

Turning to FIG. 2B, a method for encoding video data using weighted prediction is indicated generally by the reference numeral 250.

A start block 252 passes control to an input block 254. The input block 254 receives an uncompressed image block, and passes control to a function block 256. The function block 256 estimates the weighted function for a reference picture, and passes control to a function block 258. The function block 258 computes motion vectors by the difference between the image block and the reference picture using a localized weighted function, and passes control to a function block 260. The function block 260 performs motion compensation on the reference picture using the computed motion vectors to form a weighted motion compensated reference image block, and passes control to a function block 264. The function block 264 subtracts the weighted motion compensated reference image block from the uncompressed image block, and passes control to a function block 266. The function block 266 encodes the difference between the uncompressed image block and the weighted motion compensated reference block with a reference picture index, and passes control to an end block 268.

Figure 3A:
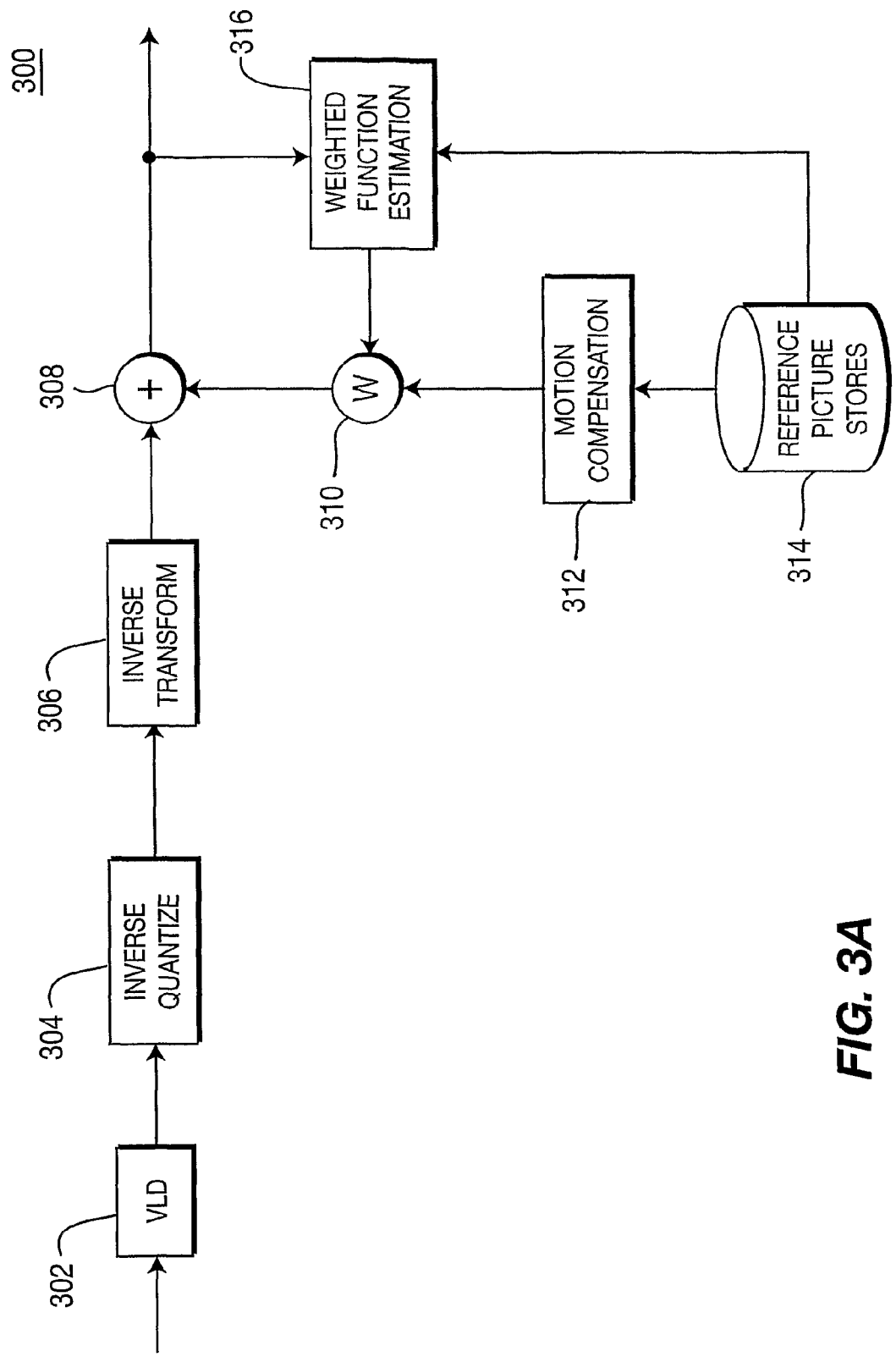
FIG. 3A shows a block diagram for a decoder for decoding video data using weighted prediction in accordance with the principles of the present invention.

Turning to FIG. 3A, a decoder for decoding video data using weighted prediction is indicated generally by the reference numeral 300.

The video decoder 300 includes a variable length decoder (VLD) 302 for receiving a digitally encoded video sequence. An output of the VLD 302 is connected in signal communication with an input of an inverse quantizer 304. An output of the inverse quantizer 304 is connected in signal communication with an input of an inverse transformer 306. An output of the inverse transformer 306 is connected in signal communication with a first input of a summing junction 308 (an element used to combine the predicted value with the output of the inverse transformer 306 to reconstruct a video output signal.

A first output of a reference picture stores 314 is connected in signal communication with an input of a motion compensator 312. A second output of the reference picture stores 314 is connected in signal communication with a first input of a weighted function estimator 316. An output of the motion compensator 312 is connected in signal communication with a first input of a weighted function module 310. An output of the weighted function estimator 316 is connected in signal communication with a second input of the weighted function module 310. An output of the weighted function module 310 is connected in signal communication with a second input of the summing junction 308. An output of the summing junction 308 is connected in signal communication with a second input of the weighted function estimator 316. The output of the summing junction 308 is available as an external output of the decoder 300.

Figure 3B:
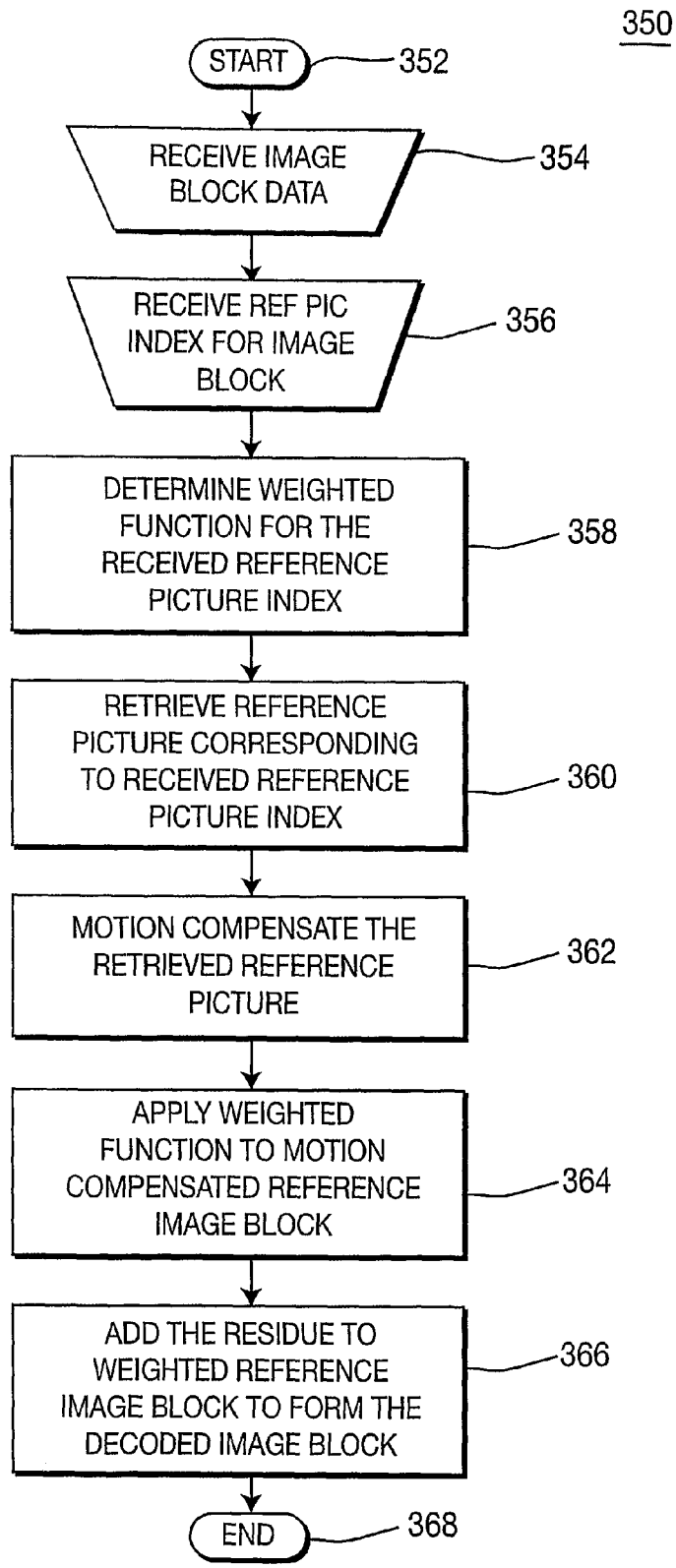
FIG. 3B shows a flow diagram for a method for decoding video data using weighted prediction in accordance with the principles of the present invention.

Turning to FIG. 3B, a method for decoding video data using weighted prediction is indicated generally by the reference numeral 350.

A start block 352 passes control to an input block 354. The input block 354 receives image block data, and passes control to an input block 356. The input block 356 receives a reference picture index for the image block, and passes control to a function block 358. The function block 358 determines the weighted function for the received reference picture index, and passes control to a function block 360. The function block 360 retrieves the reference picture corresponding to the received reference picture index, and passes control to a function block 362. The function block 362 motion compensates the retrieved reference picture, and passes control to a function block 364. The function block 364 applies a weighted function on the motion compensated reference image block, and passes control to a function block 366. The function block 366 adds the residue to the weighted reference image block to form the decoded image block, and passes control to an end block 368.

It is to be noted that the present invention may provide better results in the case of single-predicted blocks, versus bi-predicted blocks. Thus, in some instances, it may be best to combine the H.264 existing motion compensation methods (no weights or explicit and implicit weighted prediction) with the present invention, by examining the number of predictions used and selecting the proper prediction method accordingly. In particular, it may be desirable to use the principles of the present invention only for all single-predicted blocks, while for bi-predicted blocks, weights are considered based on the transmitted H.264 parameters. In an embodiment, a decoder/decoding step is capable of being combined with one or more existing decoders/decoding steps using an additional signal in a header to indicate whether the decoder/decoding step is being utilized as opposed to the one or more existing decoders/decoding steps.

The principles of the present invention may be utilized in conjunction with any block-based motion compensated video encoders and/or video decoders. Thus, it is to be appreciated that while the present invention is described herein used in an H.264 CODEC embodiment for illustrative purposes, the present invention is not limited to only the illustrated and described embodiments and, thus, other embodiments may also be employed while maintaining the scope of the present invention. For example, the present invention may be used in a stand-alone manner with respect to local brightness variation. These and other implementations of the present invention will be readily contemplated by those in this and related arts, while maintaining the scope of the present invention.

A description will now be given regarding considerations relating to an illustrative embodiment of the present invention. In the description, the following considerations will be described: weighted function W, filters F and G, neighboring samples, syntax changes, and color component generalization.

A description will now be given regarding the weighted function W. The same W function and the same derivation/fitting method of W from the corresponding neighboring pixels, $p[x,y]$ and $q[x,y]$, should be used in the decoder and the encoder. W and the corresponding derivation/fitting method can be freely chosen. For simplicity, it is suggested to use the polynomial function $y=a_0+a_1x+a_2x^2 \ldots +a_nx^n$, where $n=-1, 0, 1 \ldots$ (Note: $n=-1$ means the above method is not used) and polynomials Least-Square Fitting to derive the polynomial coefficient. The degree of polynomials n can be specified in the header. If $n=1$, then it is the same as the weighted prediction function in H.264.

A description will now be given regarding the filters F and G. Filters F and G can be the same or different filters. For simplicity, it is suggested that both F and G be identity filters. The present invention is not limited to any particular type of filter and, thus, other filters may also be employed while maintaining the scope of the present invention. For example, a median filter or any kind of de-noising filter may be utilized in accordance with the principles of the present invention.

A description will now be given regarding neighboring samples. In the decoder specification above, only one layer of neighboring pixels is used. However, it is to be appreciated that this can be generalized to multiple layers. The neighboring samples can be adaptively selected. For example, all the left, upper, and upper-left samples can be selected, or they can be adaptively selected based on the motion vectors of the neighboring block.

A description will now be given regarding syntax changes. The above method can be combined with the current H.264 CODEC and syntax. For example, one parameter (i.e., within the picture parameter sets) can be used, which signals whether this method is to be used for the current picture/slice. This parameter could also signal if a different approach is to be used for bi-prediction. Furthermore, for each reference, a separate parameter is transmitted (i.e., within the slice parameter sets) that indicates the degree of the polynomial for weighted function W. Finally, during encoding, all possible variations could be tested and the existing exhaustive Lagrangian Rate Distortion Optimization (RDO) method can be used to select the most appropriate method for each reference picture, compared to the H.264 method.

A description will now be given regarding color component generalization. The same method can be used only for the luma Y component, or selectively for all components. Selection could be done either implicitly, or explicitly through the use of picture or slice parameters.

The present invention mainly affects the motion estimation and compensation steps in the current H.264 CODEC. All other coding and decoding steps are the same as in H.264. In the following description, an example is given of how an encoder and decoder may utilize the present invention. For simplicity, a 1st degree polynomial for W is used, i.e., $$y=w(x)=a_0+x, \quad (2)$$

where $a_1=1$.

The curve fitting method is as follows:

$$a_0=\text{mean}(p[x,y]-q[x,y])=\text{mean}(p[x,y])-\text{mean}(q[x,y]) \quad (3)$$

Filters F and G are the identity filter. Only one layer neighboring samples are used and all the available upper, left, and upper-left samples are applied in Equation 3 to estimate the weights. However, it is to be appreciated that the preceding configuration is illustrative and, thus, the present invention is not limited to only the preceding configuration and other configurations may also be employed while maintaining the scope of the present invention.

One of the novel aspects of the present invention when compared to weighted prediction used in H.264 is that in H.264 weighted prediction, $a_0$ is necessarily fixed on the slice-level, while in accordance with the principles of the present invention, $a_0$ is estimated block-wise on the fly in association with a motion vector.

At the encoder, when performing motion estimation, instead of using metrics $$D(mvx, mvy) = \sum_{[x,y] \in B} |c[x, y] - r[x + mvx, y + mvy]|$$

to measure the distortion between the original signal $c[x,y]$ in the current picture and the motion predicted block $r[x+mvx,$ y+mvy] in the reference picture, where the set B includes all the sampling positions of the blocks considered, the following is used:

$$D_m(mvx, mvy) = \sum_{[x,y] \in B} |c[x, y] - \text{clip}(r[x + mvx, y + mvy] + a_0)| \text{ where} \quad (4)$$

$$\text{clip}(x) = \begin{cases} 0, & x < 0 \\ 255, & x > 255 \\ x, & o.w. \end{cases} \quad (5)$$

and $a_0$ is estimated on the fly by Equation 3 in association with motion vector (mvx,mvy).

The residue signal is then calculated as follows:

$$\text{res}[x,y] = c[x,y] - \text{clip}(r[x+mvx,y+mvy] + a_0) \quad (6)$$

After transformation and quantization, the residue signal is then entropy coded.

Note that at the encoder, in order to remove blocky artifacts, during the motion estimation, neighboring pixels can be taken into account, i.e., in Equation 4, set B covers both the pixels in the block and its neighboring samples.

At the decoder, the reconstructed signal c'[x,y] is motion compensated using the reconstructed residue signal res'[x,y] and the weights associated motion predicted signal as follows:

$$c'[x,y] = \text{res}'[x,y] + \text{clip}(r[x+mvx,y+mvy] + a_0) \quad (7)$$

Figure 4B:
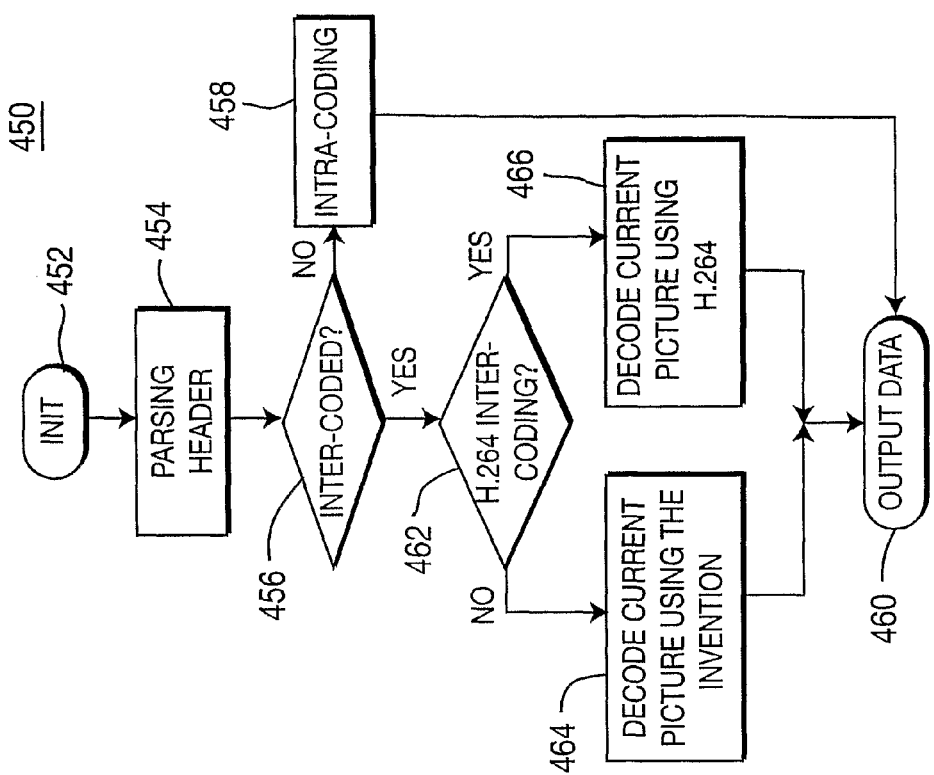
FIG. 4B shows a flow diagram for a method for decoding video data using the weighted prediction method of FIG. 3B and/or the H.264 standard.
Figure 4A:
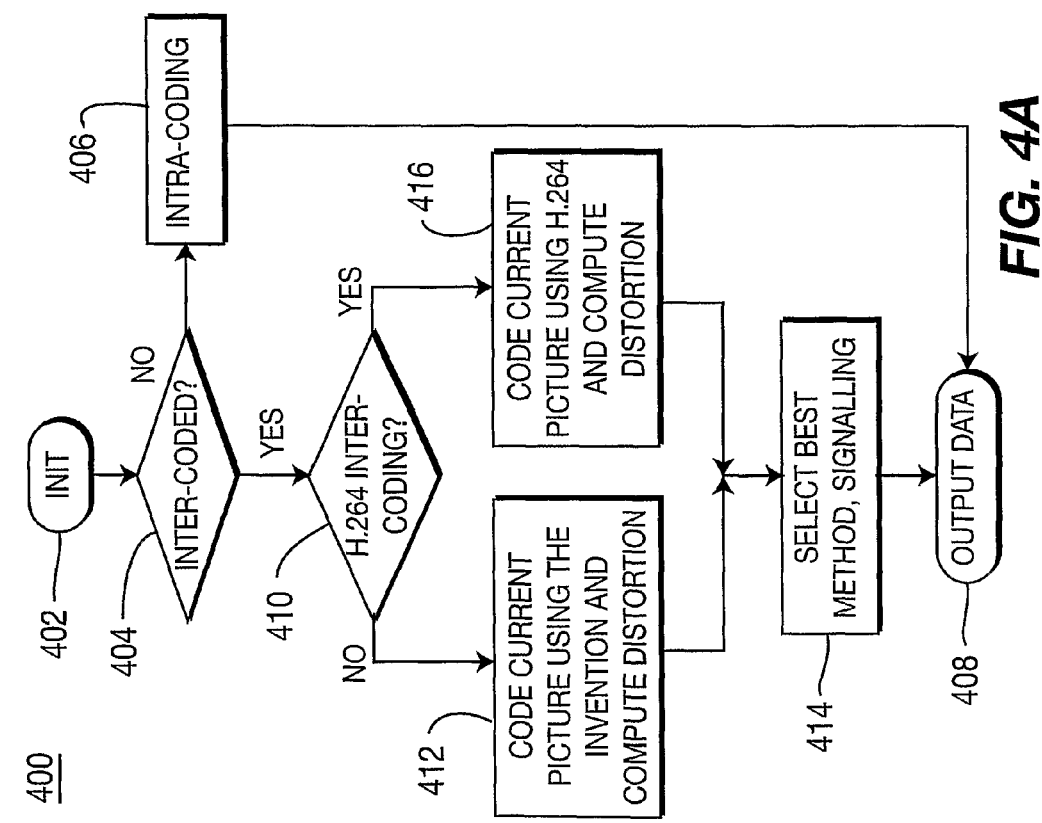
FIG. 4A shows a flow diagram for a method for encoding video data using the weighted prediction method of FIG. 2B and/or the H.264 standard.

Turning to FIG. 4A, a method for encoding video data using the weighted prediction method of FIG. 2B or the H.264 standard is generally indicated by the reference numeral 400. That is, the method of FIG. 4A utilizes either the method of the present invention or the H.264 method to code the video data. The method 400 includes a start block 402 that initializes parameters relating to the method 400, and passes control to a decision block 404. The decision block 404 determines whether or not inter-coding is to be performed. If inter-coding is not to be performed, then control is passed to a function block 406. Otherwise, if inter-coding is to be performed, then control is passed to a decision block 410.

The function block 406 performs intra-coding, and passes control to an end block 408. The end block 408 outputs the data.

The decision block 410 determines whether or not H.264 inter-coding is to be performed. If H.264 inter-coding is not to be performed, then control is passed to a function block 412. Otherwise, if H.264 inter-coding is to be performed, then control is passed to a function block 416

The function block 412 codes the current picture using the present invention as described herein, computes the distortion, and passes control to a function block 414. The function block 414 selects the best method from among outputs of function blocks 412 and 416, and passes control to end block 408.

The function block 416 codes the current picture using H.264, computes the distortion, and passes control to function block 414.

Turning to FIG. 4B, a method for decoding video data using the weighted prediction method of FIG. 3B or the H.264 standard is generally indicated by the reference numeral 450. That is, the method of FIG. 4B utilizes either the method of the present invention or the H.264 method to decode the video data. The method 450 includes a start block 452 that initializes parameters relating to the method 450, and passes control to a function block 454. The function block 454 parses the header (e.g., to determine the degree of polynomials n), and passes control to a decision block 456. The decision block 456 determines whether or not inter-coding is to be performed. If inter-coding is not to be performed, then control is passed to a function block 458. Otherwise, if inter-coding is to be performed, then control is passed to a decision block 462.

The function block 458 performs intra-coding, and passes control to an end block 460. The end block 460 outputs the data.

The decision block 462 determines whether or not H.264 inter-coding is to be performed. If H.264 inter-coding is not to be performed, then control is passed to a function block 464. Otherwise, if H.264 inter-coding is to be performed, then control is passed to a function block 466.

The function block 464 decodes the current picture using the present invention as described herein, and passes control to end block 460.

The function block 466 decodes the current picture using H.264, and passes control to end block 460.

Figure 5:
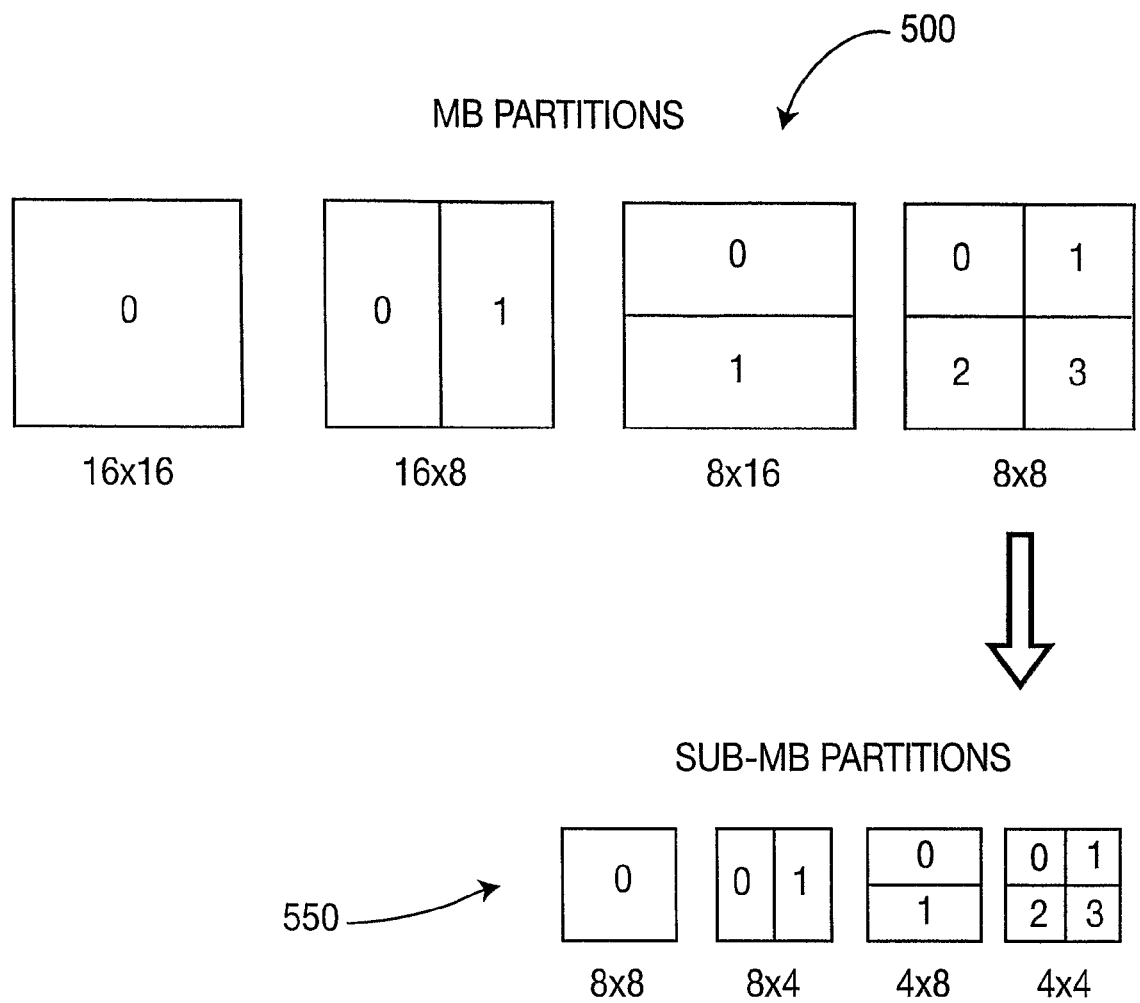
FIG. 5 shows a diagram of macroblock (MB) partitions and sub-MB partitions in the H.264 standard to which the present invention may be applied.

A description will now be given of another embodiment of the present invention that represents a simplification of the present invention. H.264 uses tree-structured hierarchical macroblock partitions. Inter-coded 16×16 pixel macroblocks can be broken into macroblock partitions, of sizes 16×8, 8×16, or 8×8. 8×8 partitions can be further broken into 8×4, 4×8 and 4×4 (see FIG. 5). Turning to FIG. 5, macroblock (MB) partitions and sub-MB partitions in the H.264 standard to which the present invention may be applied are indicated generally by the reference numerals 500 and 550, respectively. In accordance with the principles of the present invention, at the decoder, each item in Equation 3 is computed multiple times if the partition of the current macroblock is not 16×16. To simplify the above-described embodiment of the present invention, all block sizes p[x,y] are fixed to its corresponding 16×16 macroblock's neighboring pixels, denoted as pmb[x,y]. q[x,y] remains the same. Therefore, Equation 3 is simplified and reduced to the following:

$$a_0 = \text{mean}(pmb[x,y]) - \text{mean}(q[x,y]) \quad (8)$$

Thus, the mean of neighboring pixels for the current macroblock is computed only once in the decoder, thus reducing complexity.

The complexity of the present invention can be further simplified by fixing q[x,y] to be neighboring pixels of the co-located macroblock (motion vector is zero) in the reference picture, denoted as qmb[x,y]. Therefore, Equation 3 can be further simplified as follows:

$$a_0 = \text{mean}(pmb[x,y]) - \text{mean}(qmb[x,y]) \quad (9)$$

In this way, $a_0$ is only computed once at the decoder for each macroblock.

A description will now be given of some of the many attendant advantages/features of the present invention. For example, one advantage/feature is the use of a weighted function that does not require explicit coding of weights to efficiently inter-code a video that has local brightness variation. Another advantage/feature is the weighted function as described above, wherein weights for a block in the current picture are estimated from the previously encoded and reconstructed neighboring pixels of the block in the current picture and corresponding pixels in the reference picture. Yet another advantage/feature is the weighted function with weights estimated as described above, wherein the corresponding pixels in the reference pictures are the co-located pixels. Still another advantage/feature is the weighted function with weights estimated as described above, wherein the corresponding pixels in the reference pictures are motion compensated from the motion vectors used to code the block. Also, another advantage/feature is the weighted function as described above, wherein weighted functions are applied on the motion predicted block in the reference picture and motion compensation is performed on the weighted predicted motion block. Further, another advantage/feature is the weighted function as described above, wherein the weighted function can be a polynomial function or any linear or nonlinear function. Moreover, another advantage/feature is the weighted function as described above, wherein weights are estimated from the previously encoded and reconstructed neighboring pixels of the block in the current picture and its filtered corresponding motion predicted or co-located pixels in the reference pictures. Additionally, another advantage/feature is the weighted function as described above, wherein weighted functions are applied on the filtered motion predicted block in the reference picture and motion compensation is performed on the weighted predicted filtered motion block. Still another advantage/feature is the weighted function wherein the weights are estimated as described above or the weighted function wherein motion compensation is performed on the weighted predicted filtered motion block as described above, and further wherein the neighboring pixels can be any of the available upper, available left, available upper-left pixels. Moreover, another advantage/feature is the weighted function as described immediately herein before, wherein the neighboring pixels can be any of the available upper, left, upper-left pixels, adaptively selected based on the neighboring block's motion information.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

What is claimed is:

1. An apparatus for decoding video data for a picture, the video data having local brightness variation, the video decoder comprising:
   a decoder for decoding the video data using a localized weighted prediction function to determine weights for the local brightness variation,
   wherein the weights for the localized weighted prediction function are derived implicitly.

2. The apparatus according to claim 1, wherein the video data is divisible by blocks, and the weights for a block in the picture are estimated from previously decoded and reconstructed neighboring pixels of the block in the picture and corresponding pixels in a reference picture.

3. The apparatus according to claim 2, wherein the corresponding pixels in the reference picture are co-located pixels.

4. The apparatus according to claim 2, wherein the corresponding pixels in the reference picture are motion compensated from motion vectors used to inter-code the block.

5. The apparatus according to claim 2, wherein the reconstructed neighboring pixels can be any of the available upper, available left, available upper-left pixels.

6. The apparatus according to claim 2, wherein the reconstructed neighboring pixels can be any of the available upper, left, upper-left pixels, adaptively selected based on the neighboring block's motion information.

7. The apparatus according to claim 1, wherein the localized weighted prediction function is applied on a motion predicted block in a reference picture and motion compensation is performed on the weighted predicted motion block.

8. The apparatus according to claim 1, wherein the localized weighted prediction function is one of a polynomial function, a linear function, and a nonlinear function.

9. The apparatus according to claim 1, wherein the localized weighted prediction function is a polynomial function, and a degree of the polynomial function is capable of being signaled and associated with a reference picture index.

10. The apparatus according to claim 8, wherein a first degree of polynomial is used, with a first degree coefficient equal to one, and a zero degree coefficient estimated from a mean of a difference between neighboring pixels in a current picture and motion predicted or co-located pixels in a reference picture.

11. The apparatus according to claim 10, wherein the video data is divisible into macroblocks, variable block sizes are supported for a macroblock, and for any block in a current macroblock, the zero degree coefficient is computed as a difference of a mean of neighboring pixels of the current macroblock and a mean of neighboring pixels of a current motion predicted or co-located block in the reference picture.

12. The apparatus according to claim 11, wherein for the any block in the current macroblock, the zero degree coefficient can also be computed as the difference of the mean of neighboring pixels of the current macroblock and the mean of neighboring pixels of the co-located macroblock in the reference picture.

13. The apparatus according to claim 1, wherein the image data is divisible by blocks, and the weights for a block in the picture are estimated from previously decoded and reconstructed neighboring pixels of the block in the picture and filtered corresponding motion predicted or co-located pixels in reference pictures.

14. The apparatus according to claim 13, wherein the reconstructed neighboring pixels can be any of the available upper, available left, available upper-left pixels.

15. The apparatus according to claim 13, wherein the reconstructed neighboring pixels can be any of the available upper, left, upper-left pixels, adaptively selected based on the neighboring block's motion information.

16. The apparatus according to claim 1, wherein the localized weighted prediction function is applied on a filtered motion predicted block in a reference picture and motion compensation is performed on the weighted predicted filtered motion block.

17. The apparatus according to claim 1, wherein the decoder is capable of being combined with one or more existing decoders using an additional signal in a header to indicate whether the decoder is being utilized as opposed to the one or more existing decoders.

18. The apparatus according to claim 17, wherein signaling is used to indicate that at least one prediction method in a set of prediction methods is capable of using the decoder.

19. The apparatus according to claim 18, wherein the video data is divisible into image blocks, and a distinction between prediction methods in the set of prediction methods is based on a number of predictions for a current image block.

20. The apparatus according to claim 1, wherein signaling is used to indicate that at least one prediction method in a set of prediction methods is capable of using the decoder.

21. The apparatus according to claim 1, wherein the video data is divisible into image blocks, and a distinction between prediction methods in the set of prediction methods is based on a number of predictions for a current image block.

22. The apparatus according to claim 1, wherein the localized weighted prediction function is only applied to a Y component or all color components of the video data.

23. A method for decoding video data for a picture, the video data having local brightness variation, comprising the step of:
decoding the video data using a localized weighted prediction function to determine weights for the local brightness variation,
wherein the weights for the localized weighted prediction function are derived implicitly.

24. The decoding method according to claim 23, wherein the video data is divisible by blocks, and the method further comprises the step of estimating the weights for a block in the picture from previously decoded and reconstructed neighboring pixels of the block in the picture and corresponding pixels in a reference picture.

25. The decoding method according to claim 24, wherein the corresponding pixels in the reference picture are co-located pixels.

26. The decoding method according to claim 24, wherein the corresponding pixels in the reference picture are motion compensated from motion vectors used to inter-code the block.

27. The decoding method according to claim 24, wherein the reconstructed neighboring pixels can be any of the available upper, available left, available upper-left pixels.

28. The decoding method according to claim 24, wherein the reconstructed neighboring pixels can be any of the available upper, left, upper-left pixels, adaptively selected based on the neighboring block's motion information.

29. The decoding method according to claim 23, wherein said decoding step comprises the steps of applying the localized weighted prediction function on a motion predicted block in a reference picture and performing motion compensation on the weighted predicted motion block.

30. The decoding method according to claim 23, wherein the localized weighted prediction function is one of a polynomial function, a linear function, and a nonlinear function.

31. The decoding method according to claim 23, wherein the localized weighted prediction function is a polynomial function, and a degree of the polynomial function is capable of being signaled and associated with a reference picture index.

32. The decoding method according to claim 30, wherein a first degree of polynomial is used, with a first degree coefficient equal to one, and a zero degree coefficient estimated from a mean of a difference between neighboring pixels in a current picture and motion predicted or co-located pixels in a reference picture.

33. The decoding method according to claim 32, wherein the video data is divisible into macroblocks, variable block sizes are supported for a macroblock, and for any block in a current macroblock, the zero degree coefficient is computed as a difference of a mean of neighboring pixels of the current macroblock and a mean of neighboring pixels of a current motion predicted or co-located block in the reference picture.

34. The decoding method according to claim 33, wherein for the any block in the current macroblock, the zero degree coefficient can also be computed as the difference of the mean of neighboring pixels of the current macroblock and the mean of neighboring pixels of the co-located macroblock in the reference picture.

35. The decoding method according to claim 23, wherein the image data is divisible by blocks, and said decoding step comprises the step of estimating the weights for a block in the picture from previously decoded and reconstructed neighboring pixels of the block in the picture and filtered corresponding motion predicted or co-located pixels in reference pictures.

36. The decoding method according to claim 35, wherein the reconstructed neighboring pixels can be any of the available upper, available left, available upper-left pixels.

37. The decoding method according to claim 35, wherein the reconstructed neighboring pixels can be any of the available upper, left, upper-left pixels, adaptively selected based on the neighboring block's motion information.

38. The decoding method according to claim 23, wherein the localized weighted prediction function is applied on a filtered motion predicted block in a reference picture and motion compensation is performed on the weighted predicted filtered motion block.

39. The decoding method according to claim 23, further comprising the step of combining said decoding step with one or more existing decoding steps using an additional signal in a header to indicate whether the decoder step is being utilized as opposed to the one or more existing decoding steps.

40. The decoding method according to claim 39, wherein signaling is used to indicate that at least one prediction method in a set of prediction methods is capable of using the decoding step.

41. The decoding method according to claim 40, wherein the video data is divisible into image blocks, and a distinction between prediction methods in the set of prediction methods is based on a number of predictions for a current image block.

42. The decoding method according to claim 23, wherein signaling is used to indicate that at least one prediction method in a set of prediction methods is capable of using the decoding step.

43. The decoding method according to claim 23, wherein the video data is divisible into image blocks, and a distinction between prediction methods in the set of prediction methods is based on a number of predictions for a current image block.

44. The decoding method according to claim 23, wherein the localized weighted prediction function is only applied to a Y component or all color components of the video data.

* * * * *